Dec. 9, 1952          L. J. DE EUGENIO          2,620,612
                RIDER STEERED POWER LAWN MOWER
Filed April 28, 1950                          4 Sheets-Sheet 1

Lewis J. DeEugenio
INVENTOR.

BY *Clarence A. O'Brien*
*and Harvey B. Jacobson*
Attorneys

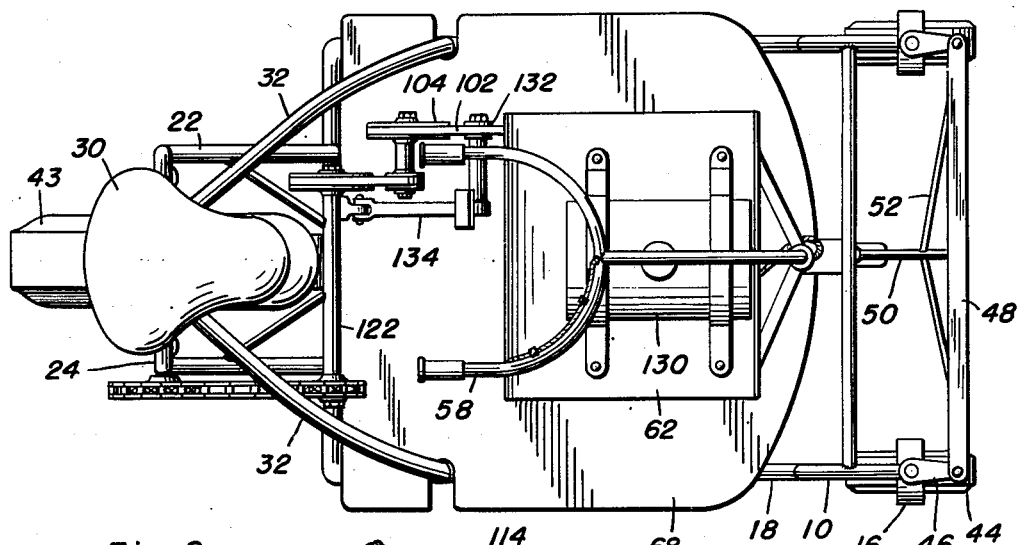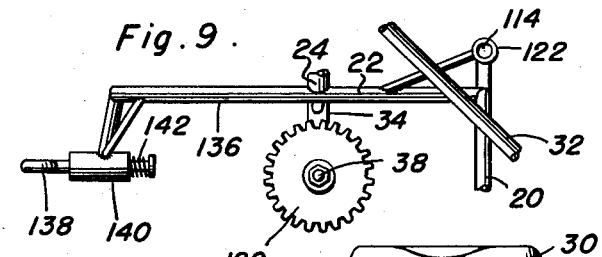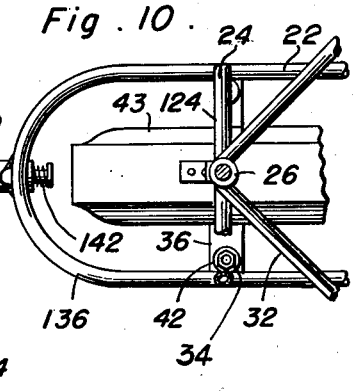

Dec. 9, 1952 — L. J. DE EUGENIO — 2,620,612
RIDER STEERED POWER LAWN MOWER
Filed April 28, 1950 — 4 Sheets-Sheet 3
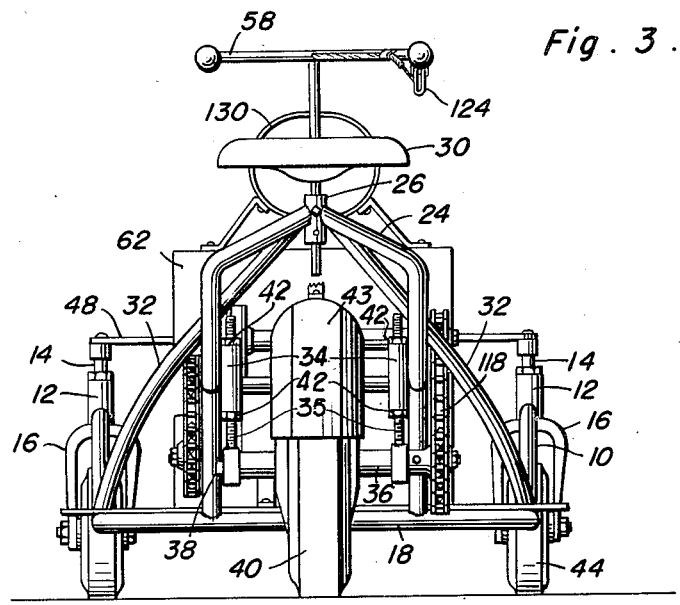
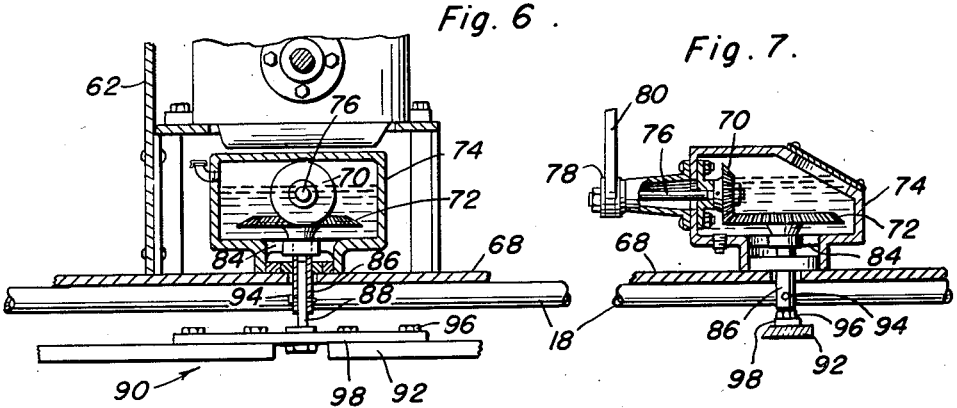
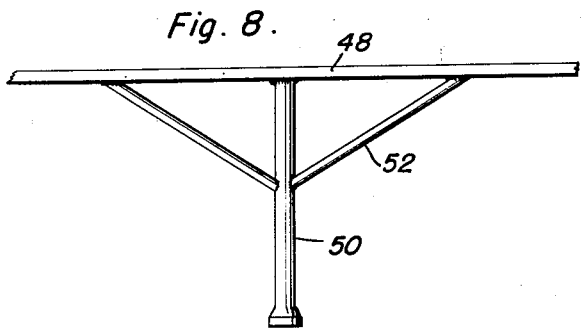
Lewis J. De Eugenio
INVENTOR.

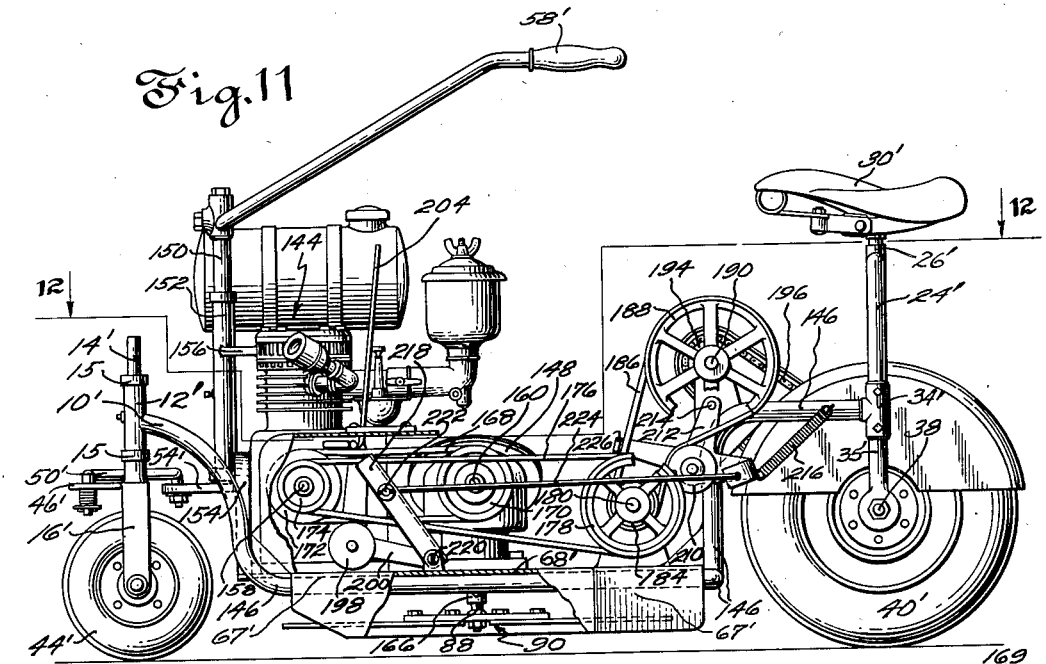

Patented Dec. 9, 1952

2,620,612

UNITED STATES PATENT OFFICE 2,620,612

RIDER STEERED POWER LAWN MOWER

Lewis J. De Eugenio, Glassboro, N. J., assignor, by mesne assignments, to The Ride-A-Mower Company, Bridgeport, Conn., a corporation of Connecticut Application April 28, 1950, Serial No. 158,690

14 Claims. (Cl. 56—25.4)

This invention relates generally to lawn mowers and more particularly to a power-operated lawn mower having a ground-contacting rear drive wheel and a pair of pivoted front steering wheels, the frame carrying a motor which drives the rear drive wheel and operates a horizontally revolving cutter at a high speed between the drive wheel and the steering wheels.

A primary object of this invention is to provide an ambulent machine which will cut grass on a lawn satisfactorily and expeditiously, the machine being self-powered and provided with a seat for the operator and handles whereby the machine may be conveniently steered.

Another object of this invention is to provide means whereby the mower is immobilized immediately upon release of the operator's foot upon a belt tightener device which operates as a clutch.

Another object of this invention is to provide a lawn mower which is very safe to operate, the frame having an underslung portion completely covered by a flat base plate and the revolving blades of the cutter being at all times covered by this plate, the other safety features including the abovementioned automatically releasing clutch mechanism, and a guard plate covering the rear portion of the engine.

Still another object of this invention is to provide a lawn mower which by reason of its having a seat conveniently located for the operator and convenient handle bars for steering the machine with a manual control for the engine incorporated with these handle bars, is adapted to generally facilitate mowing lawns.

A contributary object is so to shape and proportion the front width and rear width of the vehicle that when the front of the vehicle has been steered very close to an obstacle in passing the same the vehicle can immediately be swerved very abruptly in its course of travel with assurance that whatever has safely been cleared by the front end of the vehicle will not be interfered with by the rear end of the vehicle as a consequence of abrupt turning of corners.

In comparison with rider steered power mowers heretofore proposed, the present improvements number among their objectives advantages additional to the foregoing which include attainment of a much lower center of gravity than is usual in rider steered power mower machines in order to increase stability in making abrupt turns with a vehicle of unusually short "wheel base," relief of the rider from heat of the engine through maximum space separation of the rider therefrom in a vehicle of extremely short wheel base, easier and safer mounting and demounting of the machine by the rider through clearance away from one side of the machine of all upstanding or moving parts of mechanism, independent control of the running of the grass cutting blade and of the running of the vehicle so that either may be started or stopped independently of the other, improved control of power transmission by means of separate belt tighteners serving as selectively usable clutches in the separate drives for transmitting power to the cutting blade and to the traction wheel respectively. The foregoing and other objectives and advantages of the present improvements will be evident from the following description of illustrative forms of power dawn movers embodying the invention, the description having reference to the accompanying drawings wherein:

Fig. 2 is a top plan view of the machine.

Fig. 3 is a rear end elevational view of the machine.

Fig. 5 is a vertical sectional view, taken on the line 5—5 in Fig. 1.

Figure 4:
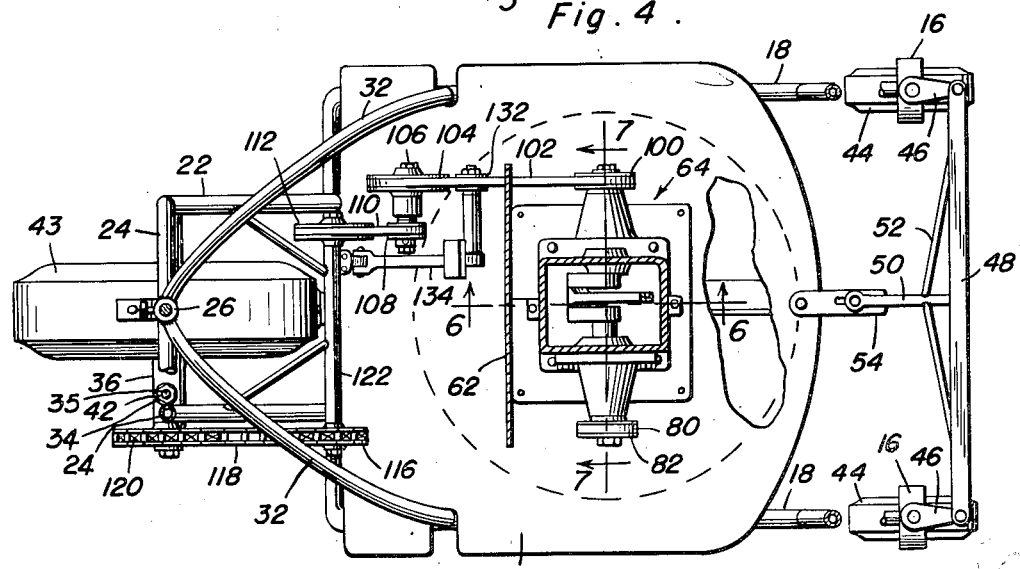
Fig. 4 is a horizontal sectional view of the machine, taken substantially upon the section line 4—4 of Fig. 1.

Figs. 6 and 7 are vertical sectional views taken on the lines 6—6 and 7—7 in Fig. 4.

Fig. 8 is an enlarged fragmentary view showing the tie rod used to connect the front steering wheels.

Fig. 9 is a side elevational view, fragmentary in character, of a rear portion of the frame modified to incorporate a draw bar.

Fig. 10 is a top plan view of the modified structure illustrated in Fig. 9.

Fig. 11 is a side elevation of a modified construction of mower embodying the present improvements.

Fig. 12 is a plan view of the modified machine shown in Fig. 11, taken partially in section on planes 12—12.

Fig. 13 is a detail view of the hand operated clutch in the driving mechanism of the cutter blade taken in section on the plane 13—13 in Fig. 12 looking in the direction of the arrows.

Fig. 14 is a detail view of the clutch handle holding ratchet incorporated with the belt guard of Fig. 13 and is a fragmentary plan view of the latter taken in section on the plane 14—14.

Similar characters of reference designate similar or identical elements and portions throughout the specification and throughout the several views and drawings.

Figure 1:
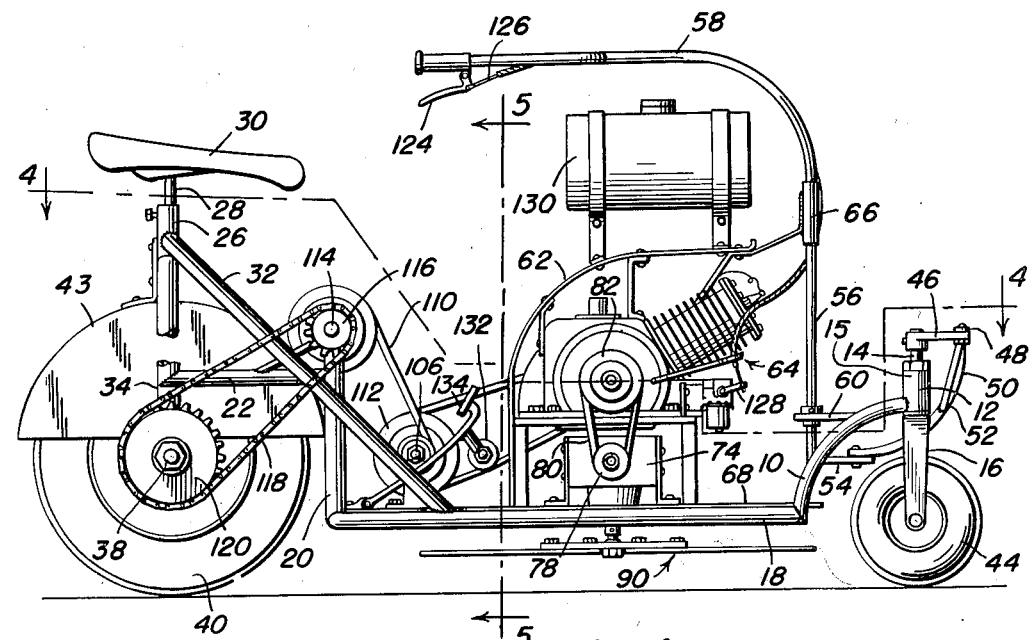
Fig. 1 is a side elevational view of the assembled machine.

Referring now to the drawings, Figs. 1 to 10, inclusive, show a rider controlled power lawn mower embodying this invention which includes a frame which will be constructed largely from tubular metal stock to include the front portion 10 having bearings 12 to receive shank portions 14 of steering wheel forks or swivels 16, and an underslung portion 18 and a rear portion including vertical members 20 at the rear end of the underslung portion 18, rearwardly extending horizontal members 22 and the rear transverse bar 24 which may be upwardly arched at the center to carry a sleeve 26 to receive a depending shank 28 of the seat 30. The frame will also include arcuate rearwardly and upwardly extending braces 32 connecting intermediate portions of the underslung portion 18 of the frame with the sleeve 26, and the frame will include depending tubular portions indicated at 34 in Fig. 1 having externally threaded rods 35 (see Fig. 3) vertically adjustably mounted therein by means of upper and lower internally threaded thrust collars or nuts 42, each of said rods forming in effect the shank of a fork carrying an elongated transversely disposed axle housing 36 for the axle 38 of the drive wheel 40. The frame, along with the rotary blade 90, is tilted about both longitudinal and transverse axes by adjustment of the collars 42. In Figs. 1 and 11 corresponding threaded collars or nuts 15 can have threaded engagement with the lower and upper ends of the shank portions 14 and 14' of the forks 16 to thrust against the ends of bearings 12 or 12' thereby to adjust the height of the front end of the frame. A wheel guard 43 is provided to cover the rear drive wheel 40.

The steering ground wheels 44 are carried by the above-mentioned forks 16 and these forks are each provided with a steering knuckle 46, while these knuckles 46 are connected by a trussed type of tie rod 48 of girder construction best shown in Fig. 8. This tie rod includes an arcuate depending member 50 and a pair of inclined braces 52 connecting the arcuate member with the tie rod 48. The lower and rear end of the arcuate member 50 is pivoted to a swingable actuating arm 54 fixed on and extending forward from a depending portion of steering post 56 which is journaled in a bearing member 60 rigidly supported on the front portion 10 of the frame. Steering post 56 fixedly carries a thrust collar 57 atop bearing 60 and a thrust shoulder 58 therebelow.

A handle bar assembly 58 is fixedly joined to steering post 56 forming a part of steering gear connecting the handle 58 to ground wheels 44 and post 56 is further supported from an arcuate guard plate 62 covering the rear portion of the engine generally represented by the numeral 64. This guard plate carries a vertical bearing 66 at its upper forward end in which steering post 56 is journaled.

The underslung portion 18 of the frame is covered by a substantially flat floor plate 68 which may be notched laterally to receive lower end portions of the arcuate braces 32 and this base plate will ordinarily be welded to the tube structure of the underslung portion 18. The tread of drive wheel 40 is proximate the rear edge of floor plate 68 and the treads of the steering or ground wheels 44 are proximate the front edge of such floor plate. In Fig. 1 engine 64 is elevated above and derives its support from floor plate 68 which also supports a set of bevel gears 70 and 72 within a gear box 74. Gear 70 is connected by a shaft 76 with a pulley 78 which is driven by a belt 80 and trained about a drive pulley 82 on the engine 64. The gear 72 rides upon a stationary bearing spider 84 in the gear box 74 and has a depending shaft 86 which is hollow at its lower end to receive the axis shaft 88 of a grass cutter 90. The shaft 88 supports the cutter 90 with the blades 92 thereof held in horizontal position and is pinned as indicated at 94 to the hollow shaft 86, while the blades 92 are directly connected by bolts and nuts 96 on a disc or plate 98 rigidly secured to the lower end of the axis shaft 88.

The power transmitting means between the engine 64 and the vehicle propelling or traction wheel 40 includes a pulley 100 motivated by the engine 64, a belt 102 connecting this pulley to another pulley 104 on a shaft 106 freely rotatably supported on the frame of the machine. Another pulley 108 is rigidly mounted upon the shaft 106 and drives a belt 110 which is trained around still another pulley 112 on a countershaft 114. A gear wheel 116 is rigidly secured to the other end of this shaft 114, the shaft extending transversely across a major portion of the width of the machine and a sprocket wheel 116 being mounted on the end of the shaft remote from the pulley 112, from which sprocket wheel a sprocket chain 118 extends to drive a sprocket wheel 120 fixed on one end of the axle 37 of the traction wheel. In this connection, it may be noted in Fig. 5 that the tubular construction of the frame facilitates the provision of suitable bearing such as the bearing 122 for the elongated shaft 114.

A belt tightener pulley 132 is mounted on a pedal lever 134 pivoted to the frame in front of the seat 30, the belt tightener pulley 132 being depressable on to the belt 102 to tighten the same and to cause the motivation of the drive wheel 40 when the engine 64 is operating and the operator of the machine depresses the pedal lever 134.

The handle bars 58 are provided with a manual lever control 124 and a Bowden wire 126 extending to the throttle control 128 of the engine 64, and a gasoline tank 130 may be mounted on the guard plate 62.

In one modified form of the invention illustrated in Figs. 9 and 10, the frame is provided with a tow bar 136 of arcuate form extending rearward from the frame as illustrated and having an eye member 138 with a shank portion slidably mounted within a sleeve 140 integral with the draw bar and biased in one direction by a spring 142. To the resiliently biased eye member 138 of tow bar 136 there may be pivotally connected the draft tongue of any trailer appliance which may thus be hauled by the traction power of my improved mower. Such trailer appliance may be a lawn roller, a rake, a small cart, various ground working implements as plows and harrows or plows for moving snow.

Certain safety features of the invention will be apparent from the drawings and foregoing description. Floor plate 68 is of size and character to prevent inadvertent contact of an operator's foot with the revolving blades of the cutter 90. The pedal lever 134 which is depressed by foot power when the rider wishes to have the machine propelled forwardly automatically stops tightening pressure of its carried idler pulley 132 on the belt when released from pressure by the rider's foot, and the machine will immediately stop. The guard plate 62 prevents inadvertent contact of the rider's person with any portion of the hot engine or parts driven thereby. Floor plate 68' has depending edge flanges 67' in Fig. 11.

In operation the engine is started by any conventional method, the rider mounts the seat 30, grasps the handle bars 58 and steps on clutch pedal 134 with varying degrees of pressure to cause the machine to be propelled forward in whatever direction the rider may steer. The grass will be cut throughout whatever path is traversed by its cutter blades 92. Very short turns of the vehicle can be made and the cutting blades will cut as close to obstacles upstanding from the ground as is the distance between end of the cutter blades and side edge of the floor plate 68.

In Figs. 11–14, there is shown a modified construction of the improved lawn mower wherein the engine 144 is displaced farther to the front of the modified tubular chassis frame 146 so that it occupies a position lengthwise of the vehicle that is intermediate the transmission box 148 and the frontmost upstanding steering post 150, instead of, as in Fig. 1, being elevated and positioned directly over the transmission box 148. Also in this modified construction the steering post 150 is provided with a vertically elongated bearing 152 supported rigidly on the chassis frame by means of a base bracket 154 bolted to the latter being further steadied by a brace 156 connecting bearing 152 to the cylinder block of the engine and removably secured to the latter as by a bolt (not shown). Handle bars 58' rigidly join steering post 150.

In this modified organization of the major units of the mower corresponding structural elements of the chassis are in general designated by the same numerals as in Figs. 1 to 10, but primed. The engine is transferred to a position more remote from a rider occupying the seat 30'. This affords welcome relief from the heat of the engine. It also produces a conveniently greater center distance from the axis of engine shaft 158 to the axis of shaft 160 of the transmission box 148. The transmission may in conventional manner include a driving beveled pinion 162 and a driven beveled gear 164 to which latter, as in Fig. 6, is fixed the hollow shaft 166 adapted to receive and rotate the cutter shaft 88.

Also in this modification the separate belt 168 which here drives the pulley 170 on shaft 160 of drive pinion 162 has its driving pulley 172 fixed on the engine shaft 158 at the same side of the engine as is the driving pulley 174 of the vehicle propelling system.

There is in Figs. 11 and 12 a somewhat modified arrangement of power transmission for propelling the vehicle which includes in addition to engine pulley 174 a belt 176 connecting this pulley to another pulley 178 fast on the same countershaft 180 to which is fixed a pulley 184 that drives a belt 186 which is trained around still another pulley 188 on another countershaft 190 that is freely rotatable in a bearing 192 fixed on the chassis frame. Countershaft 180 is journaled in frame bearing 182. A sprocket wheel 194 is fixed on the other end of shaft 190 at the opposite side of the vehicle and through sprocket chain 196 drives the sprocket wheel 120' which as in the case of sprocket 120 in Figs. 1 and 2 is fixed on one end of the traction wheel axle 38.

The above described revised relationship of the cutter driving power transmission to the vehicle propelling power transmission not only affords relief from engine heat by spacing the engine farther from the rider but bares the right hand side of the mower from all upstanding and moving parts thus making a safe and clear way above the floor plate 68' for unimpeded sweep of the rider's feet in mounting and dismounting from the machine. It furthermore enables the concentrated weight of the engine, which is the heaviest unit of the machine, to occupy a considerably lower level than is possible in Figs. 1 and 2 giving a stabilizing advantage that results from lower center of gravity in the machine as a whole. This feature is important in making sharp turns either to the left or to the right in the grass cutting travel of the machine.

In this modified arrangement there is convenient room for adding a power cut-out clutch operative on the cutter driving belt 168. This clutch appears in Fig. 13 as an idler pulley 198 loosely rotatable on the elbow of a crank arm 200 that is pivoted on the chassis frame at 202 and carries an operating handle 204 upstanding to a point within easy reach of the operator's hand while occupying the rider's seat 30'. Arm 200 tends to drop by gravity except when handle 204 is pulled back toward the rider, in which case it catches in detent notches 206 in the edge of a stay plate 207 fixed on the belt guard casing 169 that is removably stationed on the frame of the machine. Handle 204 may be disengaged at will from notches 206. When handle 204 is held in a proper one of these detent notches, it maintains the idler pulley 198 pressing upward on belt 158 to exert a proper degree of tightening on the latter. This will cause the belt to drive cutter blade 90 only when handle 204 is thus detained in, say, its broken line position in Figs. 13 and 14. Handle 204 also fixedly carries a guard pin 208 freely overhanging the upper stretch of belt 168 in a manner to limit upward arching of same.

As in Figs. 1 and 2, there is in Figs. 11 and 12 a clutch 210 that performs a function equivalent to that of clutch 134 for applying and disconnecting engine power effective on the vehicle propelling or traction wheel 40. In its modified form clutch 210 consists of a belt tightening idler pulley 210 that is loosely rotatable on a swingable bell crank lever 212 that is pivotally mounted on the chassis frame at 214. Pulley 210 is normally urged away from belt 186 by an axially stretched spring coil 216 connecting lever 212 with the chassis frame. Idler pulley 210 can be forced forward, or toward the left in Fig. 11, against belt 186 by pressure of the rider's foot on pedal 218 while the rider occupies seat 30'. Foot pedal 218 is pivotally mounted on the chassis frame at 220 and has pivotally coupled to it at 222 a pull rod 224 whose opposite or rear end has pivotal connection to lever 212. Lever 212 further carries fixedly thereon a belt guard 226 that overhangs the front stretch of belt 186 in a manner to limit forward arching thereof.

Various changes in the shape and welded together relationship of the tubular elements comprising the chassis frame will be self evident in the revised construction shown in Figs. 11 and 12 all of which will readily be identified with the corresponding parts of the structure shown in Figs. 1 and 2 by reference to the same characters primed to indicate their modified construction.

While Fig. 11 does not show handle bars 58 equipped with an engine throttle control such as 124 obviously the same will be supplied in any conventional manner.

This application is a continuation-in-part of my copending application, Serial No. 36,787 filed July 2, 1948, now abandoned.

The principles of construction and organization of the major units of a rider steered lawn mower which give rise to the operating advantages of my improved machine may be embodied in various departures from the exact shapes and disposition of parts herein pictured and described wherefore the following claims are directed to and intended to cover all such departures as come within the broadest interpretation of their definitions.

I claim:

1. In a lawn mower, a vehicle frame including an underslung portion covered by a floor plate, an engine, an engine driven grass cutting blade supported by said frame to rotate beneath said floor plate at selective heights and angles with respect to the ground, a single traction wheel narrow in relation to the width of the vehicle and confined to a location central of said width spaced well to the rear of said engine, said traction wheel supporting the rear portion of said frame, a fork affording rotary bearing for said traction wheel and having an upstanding shank, a vertical slide bearing fixed on said rear portion of said frame penetrated by said shank, screw adjusting means operative to maintain said shank at various selective heights in said slide bearing for shifting the height of said rear portion of the frame to selective heights above said traction wheel, ground wheels supporting the front portion of said frame, steering forks affording rotary bearings for said ground wheels respectively, a caster shank on each of said steering forks, laterally spaced vertically disposed caster bearings fixed on said front portion of said frame penetrated by said caster shanks, and screw adjusting means operative to maintain each of said caster shanks at various selective heights in said caster bearings for independently shifting said front portion and the side portion of said frame to selective heights above said ground wheels.

2. A rider controlled grounds tending vehicle embodying in combination, a unitary rigid chassis frame having a low underslung floor plate intermediate its front and rear ends extending substantially the entire width of the vehicle, a prime mover mounted on said frame confined substantially to the top side of said floor plate, a pair of vehicle steering ground wheels supporting the front end of said frame and swingable relatively thereto having their ground treads proximate the front edge of said floor plate to compact the length of the vehicle, a steering post journaled on said frame at the front of said prime mover connected to swing said ground wheels for steering the vehicle and carrying a steering handle extending over said prime mover and reaching to the rear of the latter, a single traction wheel narrow in relation to the width of the vehicle and confined to a location central of said width spaced well to the rear of said prime mover, said traction wheel supporting the rear end of said frame and being rotatable about an axis disposed in fixed relation thereto at a level substantially higher than said floor plate and having its ground tread proximate the rear edge of said floor plate to compact the length of the vehicle, a rider's seat stationed on said frame well to the rear of said prime mover over said traction wheel within foot reach of said floor plate, power transmitting mechanism including a motor driven wheel and a traction wheel driving wheel located above said floor plate, an endless belt loosely trained about said driven and driving wheels, an idler wheel located above said floor plate swingably mounted on said frame to move toward and away from said belt thereby at times to engage and press against the latter in belt tightening direction, and a pedal connected to swing said idler wheel stationed above said floor plate at the outer side of said belt within foot reach of a rider occupying said seat whereby the rider's legs straddle said belt to reach said pedal.

3. A rider controlled lawn tending vehicle as defined in claim 2, together with a spring connected to bias said idler wheel in a direction away from said belt thereby normally to leave said belt loose and inoperative to transmit power to the said traction wheel.

4. A rider controlled lawn tending vehicle as defined in claim 2, together with a guard casing upstanding between the said belt and the said driven and driving wheels extending to cover the latter, and an abutment stationed proximate said belt in a position to limit arching thereof when the belt is subjected to pressure of the said idler pulley.

5. A rider controlled lawn tending vehicle embodying in combination, a unitary rigid chassis frame having a low underslung floor plate intermediate its front and rear ends extending substantially the entire width of the vehicle, a prime mover mounted on said frame confined substantially to the top side of said floor plate, a pair of vehicle steering ground wheels supporting the front end of said frame swingable relatively thereto having thir ground treads proximate the front edge of said floor plate to compact the length of the vehicle, a steering post journaled on said frame at the front of said prime mover connected to swing said ground wheels for steering the vehicle and carrying a steering handle extending over said prime mover reaching to the rear of the latter, a single traction wheel narrow in relation to the width of the vehicle and confined to a location central of said width, said traction wheel supporting the rear end of said frame and being rotatable about an axis disposed in fixed relation thereto at a level substantially higher than said floor plate and having its ground tread proximate the rear edge of said floor plate to compact the length of the vehicle, a rider's seat stationed on said frame over said traction wheel within foot reach of said floor plate, power transmitting mechanism connecting said prime mover drivingly to said traction wheel including a clutch located above said floor plate, and a pedal connected to operate said clutch stationed above said floor plate within foot reach of a rider occupying said seat.

6. A rider controlled lawn mower embodying in combination with a vehicle as defined in claim 5, a vertical shaft journalled on the said frame and depending below the said floor plate drivably connected with the said prime mover, and a cutter having horizontally elongated blades carried on the lower end of said shaft entirely separated from the said seat and from the said clutch operating pedal by the said floor plate, thereby to protect the foot of the rider from injury by said blades.

7. A rider controlled lawn mower as defined in claim 6, in which at least one half of the width of the said floor plate is bare of upstanding obstacles to the free sweep of at least one foot of the rider transversely onto and off from the top surface of said floor plate between the said prime mover and the said seat.

8. A rider controlled vehicle as defined in claim 5, in which substantially a continuous third of the whole area of the said floor plate at the side thereof opposite the said pedal is bare of upstanding obstacles to the free sweep of the foot of the rider not applied to said pedal transversely onto and off from the top surface of said floor plate between the said prime mover and the said seat.

9. A rider controlled lawn tending vehicle as defined in claim 5, in which the said power transmitting mechanism includes in combination with the power shaft of the said prime mover, a power pulley on said shaft, a counter shaft, a speed reducing driven pulley on said counter shaft larger than said power pulley, a driving pulley on said counter shaft smaller than said driven pulley, a second counter shaft, a load pulley on said second counter shaft larger than said driving pulley, driving connections from said load pulley to the said traction wheel, a belt trained about said power pulley and said driven pulley, a belt trained about said driving pulley and said load pulley, and a belt tightener operative on the last said belt constituting the said clutch and operated by the said foot pedal.

10. A rider controlled lawn tending vehicle as defined in claim 9, in which the said clutch comprises an idler wheel located above the said floor plate, together with an arm carrying said idler wheel swingably mounted on said frame to move said idler wheel toward and away from the said belt thereby at times to press said idler wheel against the belt in belt tightening direction, the said foot pedal being connected to swing said arm.

11. A rider controlled lawn tending vehicle as defined in claim 5, together with a guard casing above the said floor plate covering the said power transmitting mechanism and clutch and positioned to be straddled by a rider occupying the said seat, the said foot pedal being outside of said guard casing and thereby accessible to one foot of the rider.

12. A rider steered grounds tending power vehicle embodying in combination with a unitary substantially rigid vehicle frame and a grounds working tool revolvable about an axis fixed in relation to said frame, an overall size reducing organization of power plant and vehicle control mechanism, comprising, an engine located at least no farther to the rear of said frame than is said grounds working tool connected to drive the latter, a single traction wheel spaced well to the rear of said engine narrow in relation to the width of the vehicle and confined to a location central of said width, said traction wheel supporting the rear end of said frame and being connected to derive vehicle propelling power from said engine, vehicle steering ground wheels located substantially forward of said engine and of said working tool, steering swivels on said frame supported by said ground wheels, a seat stationed on said frame over said traction wheel likewise spaced well to the rear of said engine, a steering handle within reach of a rider occupying said seat, and steering gear connecting said steering handle with said swivels at least in part extending from said handle forward over and downward in front of said engine.

13. A rider steered grounds tending power vehicle embodying in combination with a unitary substantially rigid vehicle frame and a grounds working tool revolvable about an axis fixed in relation to said frame, an overall size reducing organization of power plant and vehicle control mechanism, comprising, an engine on said frame having a power shaft extending transversely of the vehicle located at least no farther to the rear of said frame than is said grounds working tool, a single vehicle propelling traction wheel spaced well to the rear of said engine, narrow in relation to the width of the vehicle and confined to a location central of said width, said traction wheel supporting the rear end of said frame and having its axis of rotation fixed in relation thereto, vehicle steering ground wheels located respectively at front corner positions of said frame substantially forward of said power shaft and of said grounds working tool, steering swivels on said frame supported by said ground wheels, power transmitting mechanism apart from and independent of all said wheels arranged to convert rotary motion of said engine shaft into rotary motion of said working tool, a separate power transmission arranged to deliver vehicle propelling power to said traction wheel from said engine shaft, a seat stationed on said frame over said traction wheel, a steering handle within reach of a rider occupying said seat, and steering gear connecting said steering handle with said swivels at least in part extending from said handle forward over and downward in front of said engine.

14. A rider steered grounds tending power vehicle embodying in combination with a unitary substantially rigid vehicle frame and a frame carried grounds working tool revolvable in relation thereto, an overall size reducing organization of power plant and vehicle control mechanism comprising, an engine on said frame located at least no farther to the rear than is said grounds working tool, a single traction wheel supporting the rear end of said frame connected to derive vehicle propelling power from said engine spaced well to the rear of said engine narrow in relation to the width of the vehicle and confined to a location central of said width, vehicle steering ground wheels located substantially forward of said engine supporting the front end of said chassis, a driver's seat located on said frame over said traction wheel, a steering handle in reach of a driver on said seat, and steering gear operatively connecting said handle to said ground wheels.

LEWIS J. DE EUGENIO.

REFERENCES CITED

The following references are of record in the file of this patent:

UNITED STATES PATENTS

| Number | Name | Date |
| --- | --- | --- |
| 796,811 | Coldwell et al. | Aug. 8, 1905 |
| 950,728 | Provot | Mar. 1, 1910 |
| 1,685,903 | Bolens | Oct. 2, 1928 |
| 1,938,882 | Wilson | Dec. 12, 1933 |
| 1,989,995 | Martin | Feb. 5, 1935 |
| 2,192,468 | Gore | Mar. 5, 1940 |
| 2,530,041 | Bennett | Nov. 14, 1950 |
| 2,536,749 | Jenner et al. | Jan. 2, 1951 |
| 2,540,894 | Krause | Feb. 6, 1951 |

FOREIGN PATENTS

| Number | Country | Date |
| --- | --- | --- |
| 676,595 | France | Feb. 25, 1930 |
| 159,010 | Switzerland | Dec. 15, 1932 |